United States Patent
Guthrie et al.

(10) Patent No.: US 8,000,076 B2
(45) Date of Patent: Aug. 16, 2011

(54) INTERRUPTER, A METHOD OF RESPONDING TO A MONITORED EVENT AND AN INTEGRATED CIRCUIT INCLUDING AN INTERRUPTER

(75) Inventors: Stephen C. Guthrie, Allen, TX (US); Subarna Pal, Mesquite, TX (US)

(73) Assignee: Lineage Power Corporation, Plano, TX (US)

( * ) Notice: Subject to any disclaimer, the term of this patent is extended or adjusted under 35 U.S.C. 154(b) by 153 days.

(21) Appl. No.: 12/503,706

(22) Filed: Jul. 15, 2009

(65) Prior Publication Data

US 2011/0012649 A1 Jan. 20, 2011

(51) Int. Cl.
*H02H 9/00* (2006.01)
(52) U.S. Cl. .......................................... 361/111; 361/56
(58) Field of Classification Search ............... 361/18, 361/56, 58, 111
See application file for complete search history.

(56) References Cited

U.S. PATENT DOCUMENTS

| | | | | |
|---|---|---|---|---|
| 4,586,179 A | * | 4/1986 | Sirazi et al. | 714/22 |
| 4,586,180 A | * | 4/1986 | Anders et al. | 714/24 |
| 4,696,002 A | * | 9/1987 | Schleupen et al. | 714/23 |
| 5,546,588 A | * | 8/1996 | Deems et al. | 713/310 |
| 2010/0162054 A1 | * | 6/2010 | Asuncion et al. | 714/56 |

* cited by examiner

*Primary Examiner* — Danny Nguyen

(57) ABSTRACT

An interrupter, a method of responding to a monitored event and an IC are disclosed. In one embodiment, the interrupter includes: (1) a monitoring circuit configured to monitor for an occurrence of at least one event and generate an external event signal when detecting the occurrence, (2) a microprocessor, having: (2A) at least one functional pin and (2B) a reset input pin, coupled to the monitoring circuit, the microprocessor configured to begin a reset process in response to receiving the external event signal at the reset input pin and thereby set the functional pin to a reset state, and (3) a responding circuit coupled to the functional pin and configured to initiate a predetermined action when the functional pin is set to a reset state.

20 Claims, 3 Drawing Sheets

INTERRUPTER, A METHOD OF RESPONDING TO A MONITORED EVENT AND AN INTEGRATED CIRCUIT INCLUDING AN INTERRUPTER

TECHNICAL FIELD

This application is directed, in general, to an integrated circuit (IC) and, more specifically, employing an IC to respond to monitored events.

BACKGROUND

Some conventional microprocessors have an included functionality, an interrupt functionality, which may be used to stop normal processing and perform a special task in a timely manner. In some instances the special task is a protection function. With the interrupt functionality, a microprocessor is programmed to fetch a set of instructions when receiving an external signal at a designated input pin and generate a signal on a designated output pin to stop or interrupt the potentially harmful condition. One skilled in the art will understand the interrupt functionality that is provided with some conventional microprocessors.

Some microprocessors do not include the interrupt functionality due to, for example, the additional cost. As such, lower cost microprocessors may be programmed to poll for certain conditions to determine if an interrupting function is needed. The response time associated with such polling, however, can be slower than desired.

SUMMARY

One aspect provides an interrupter. In one embodiment, the interrupter includes: (1) a monitoring circuit configured to monitor for an occurrence of at least one event and generate an external event signal when detecting the occurrence, (2) a microprocessor, having: (2A) at least one functional pin and (2B) a reset input pin, coupled to the monitoring circuit, the microprocessor configured to begin a reset process in response to receiving the external event signal at the reset input pin and thereby set the functional pin to a reset state, and (3) a responding circuit coupled to the functional pin and configured to initiate a predetermined action when the functional pin is set to a reset state.

In another aspect, a method of responding to a monitored event is disclosed. In one embodiment, the method includes: (1) initiating a reset process of a microprocessor, (2) automatically setting at least one functional pin of the microprocessor to a reset state in response to the reset process, (3) operating circuitry that is external to the microprocessor based on the automatically setting to initiate an action and (4) determining if the reset process was initiated by an external event signal or another reset source associated with the microprocessor.

In yet another aspect, an IC is disclosed. In one embodiment, the IC includes: (1) a functional block and (2) an interrupter having: (2A) a monitoring circuit configured to monitor for an occurrence of an event associated with the functional block and generate an external event signal when detecting the occurrence, (2B) a microprocessor, including: a functional pin and a reset input pin, coupled to the monitoring circuit, the microprocessor configured to begin a reset process in response to receiving the event signal at the reset input pin and thereby set the functional pin to a reset state, and (2C) a responding circuit coupled to the functional pin and configured to initiate a predetermined action when the functional pin is set to the reset state.

BRIEF DESCRIPTION

Reference is now made to the following descriptions taken in conjunction with the accompanying drawings, in which.

DETAILED DESCRIPTION

The disclosure provides an interrupter that couples an external digital signal representing a high priority event to the reset input pin of a microprocessor. The initialization of the microprocessor port pins upon receiving a signal at the reset input pin is used to implement a fast circuit control feature. The disclosure, therefore, provides an interrupter with an interrupting functionality that employs the hardware of a microprocessor. Typically, with a microprocessor that includes interrupt functionality, the activation of an interrupt pin is followed by a latency period associated with interrupt processing overhead before software code is run to address the required control function. This software latency period is eliminated by interrupt configurations disclosed herein. Accordingly, the disclosure provides an improved interrupt compared to the typical interrupt functionality of a microprocessor or to polling for a change of state.

The microprocessor also includes a differentiator that is configured to detect the difference between a reset process (i.e., a reset) caused by the transition of the external input tied to the reset input pin (i.e., an external event signal) and other possible reset events associated with the microprocessor, such as power-up. In one embodiment disclosed herein, the differentiator is a portion of the microprocessor's memory that is programmed to perform an algorithm that detects the difference between an external event signal received at the input pin and other possible reset conditions. The differentiator allows the microprocessor to perform the appropriate follow-up control processes to complete the high priority event response.

The embodiments disclosed herein include an interrupter that has a circuit configuration and software logic. The circuit configuration is designed to employ the hardware aspects of a microprocessor reset condition to provide a rapid response to an external event (i.e., an event external to the microprocessor). The software logic differentiates the application of the external event from other reset conditions, keeps the response initiated by the hardware in the proper state and continues to set in motion the correct actions associated with that particular external event that has occurred.

Figure 1:
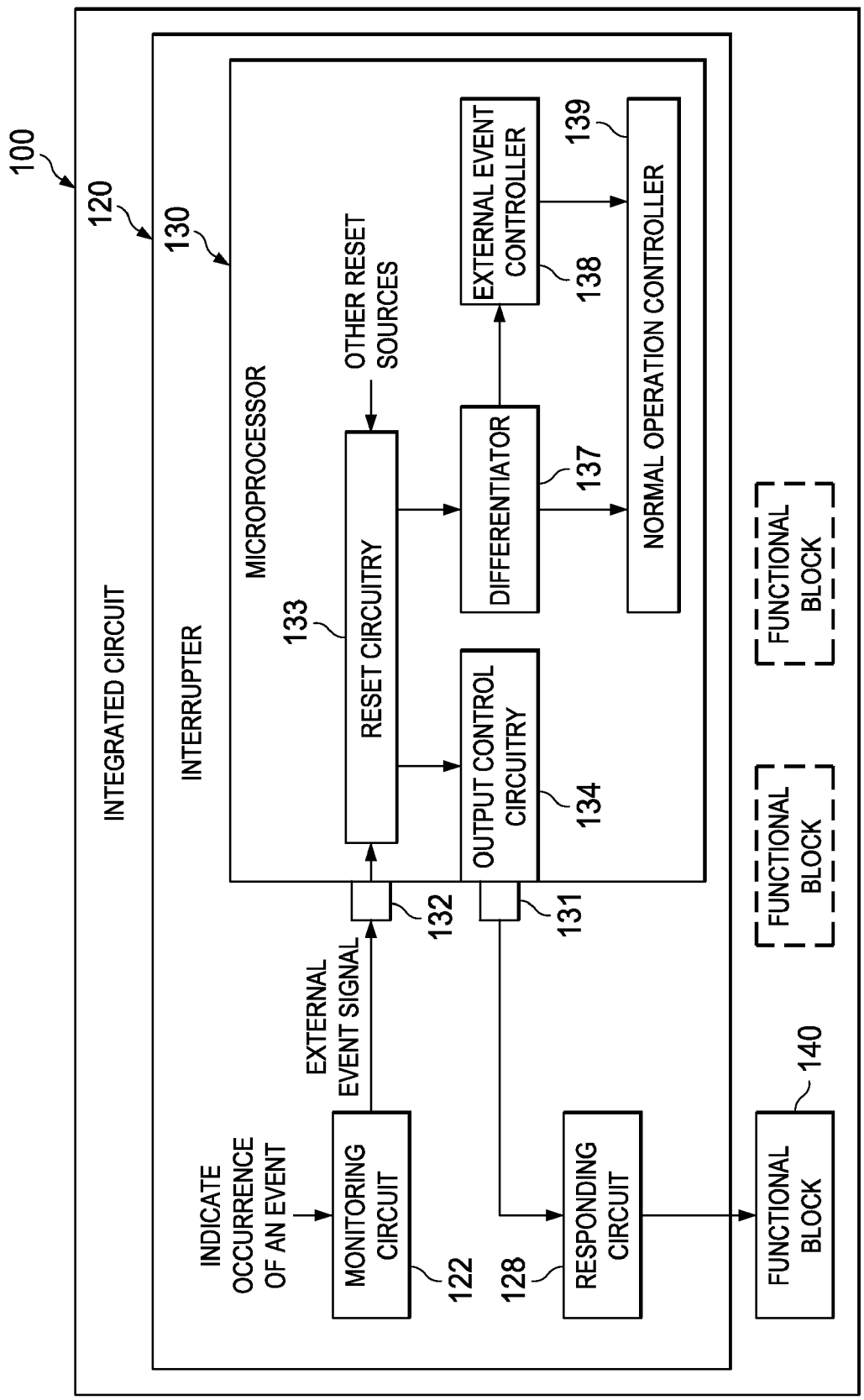
FIG. 1 is a block diagram of an embodiment of an IC constructed according to the principles of the present disclosure.

FIG. 1 is a block diagram of an embodiment of an IC 100 constructed according to the principles of the present invention. The IC 100 includes an interrupter 120 and at least one functional block 140. As represented by the additional functional block (dashed lines), the IC 100 may include a plurality of functional blocks. Additionally, the IC 100 may include additional components or devices that are not illustrated but are typically included in an IC.

The interrupter 120 is a high-speed interrupter that provides hardware interrupting functionality. The interrupter 120 includes a monitoring circuit 122, a responding circuit 128 and a microprocessor 130. The interrupting speed of the interrupter 120 is based on the speed of the reset function of the microprocessor 130. The monitoring circuit 122 is configured to monitor for an occurrence of an event and generate an external event signal when detecting the occurrence. The monitored event is external to the microprocessor 130. In the illustrated embodiment, the event may be associated with the functional block 140. The occurrence of an event may be associated with, for example, a current, a voltage, a temperature, a clock speed, power, or another condition or parameter external to the microprocessor 130. In one instance, the monitoring circuit 122 may monitor circuitry for an overcurrent condition. The circuitry being monitored may be part of the functional block 140 or another part of the IC 100. In another instance, the monitoring circuit 122 may monitor the temperature of an area of the IC 100 and determine if a temperature is over or above designated thresholds or within a designated range. The area may include at least part of the functional block 140. In some embodiments, the interrupter 120 may be used to monitor events external to the IC 100.

The monitoring circuit 122 includes the necessary circuitry and devices to monitor for the occurrence of the events. Continuing with the above examples, the monitoring circuit 122 may include an ammeter when monitoring a current. When monitoring for a temperature, the monitoring circuit 122 may include a thermometer. One skilled in the art will understand the various devices that can be used to monitor for certain conditions or parameters. In some embodiments, the monitoring circuit 122 may be configured to monitor for a plurality of conditions. As such, the monitoring circuit 122 may include a plurality of different monitoring devices. In other embodiments, the monitoring circuit 122 may be configured to monitor a single condition in multiple locations. As such, the monitoring circuit 122 may be coupled to multiple locations, such as multiple functional blocks, for monitoring. A single monitoring device may be used to monitor multiple locations.

The microprocessor 130 includes at least one functional pin 131, a reset input pin 132, reset circuitry 133, output control circuitry 134, a differentiator 137, an external event controller 138 and a normal operation controller 139. The functional pin 131 is a conventional output port pin of the microprocessor 130. One skilled in the art will understand port pins of a microprocessor and that a microprocessor typically includes multiple port pins. For simplicity, only a single port pin, the functional pin 131, and the reset input pin 132 are illustrated in FIG. 1 and discussed.

The reset input pin 132, coupled to the monitoring circuit 122, is configured to initialize the microprocessor 130 in response to receiving a signal (i.e., a transition of an external input coupled thereto) which is the external event signal. The microprocessor 130, in response to receiving an external event signal at the reset input pin 132, then sets the functional pin 131 to a reset state. The reset state is typically a high impedance state. The reset input pin 132 is a conventional reset input pin of a microprocessor that is well known and used in the art. The reset input pin 132 provides a hardware mechanism for initializing the microprocessor. Typically, the reset input pin 132 is employed during power-up to provide an organized start-up for the microprocessor 130. The reset input pin 132 could also be coupled to circuitry having, for example, a push-button, and used for a manual reset of the microprocessor 130.

As with the functional pin 131 and the reset input pin 132, the reset circuitry 133 and the output control circuitry 134 are typically included in a microprocessor. The reset circuitry 133 is configured to provide a hardware response to a reset signal received at the reset input 132, such as an external event signal, or to other internal reset sources, such as, a power-up signal or a software reset signal. The reset circuitry 133 is configured to initiate a generic reset response for the microprocessor 130. The output control circuitry 134 is configured to control the functional pin 131 according to the reset response initiated by the reset circuitry 133. The output control circuitry 134 is used by the microprocessor 130 to set the functional pin 131 to the reset state.

The differentiator 137 is configured to determine if reset of the microprocessor 130 is due to receiving an external event signal at the reset input pin 132 or from another reset source associated with the microprocessor 130 (i.e., an internal reset signal). The differentiator 137 may be configured as a series of operating instructions representing an algorithm that is stored on a computer-readable memory of the microprocessor 130 that directs the operation of the microprocessor 130 when initiated thereby. The operating instructions may be fetched during the initialization routine of the microprocessor 130. The type of memory storing the instructions (i.e., the differentiator 137) of the microprocessor 130 may be ROM. The differentiator 137 is further configured to initiate a control process for the occurrence of the event if the differentiator 137 determines the reset is initiated by an external event signal received at the reset input pin 132. The external event controller 138 is configured to perform the control process. In some embodiments, the control process may include maintaining the action performed by the responding circuit 128.

The differentiator 137 is configured to determine which reset source caused the reset process of the microprocessor 130. Depending on the determination, the differentiator 137 will generate a signal to either the external event controller 138 or the normal operation controller 139. If the differentiator 137 determines the reset process was caused due to an external event signal, then the differentiator 137 generates a signal to the external event controller 138 to initiate operation thereof. If the differentiator 137 determines the reset process was initiated by another reset event other that an external event signal, then the differentiator 137 generates a signal to the normal operation controller 139 to initiate operation thereof. As illustrated, the normal operation controller 139 would still operate even after operation of the external event controller 138. Both the external event controller 138 and the normal operation controller 139 may be configured as a series of operating instructions representing an algorithm that is stored on a computer-readable memory of the microprocessor 130 that directs the operation of the microprocessor 130 when initiated thereby. The external event controller 138 is configured to perform the appropriate follow-up control processes to complete the response (i.e., the predetermined action) to the occurrence of the high priority event. The normal operation controller 139 is configured to direct the normal operation of the microprocessor 130.

The differentiator 137, therefore, is configured to determine the difference between a reset generated by a special monitored event and other reset conditions that can occur. Accordingly, a reset of the microprocessor 130 initiates two parallel processes; one associated with the hardware of the microprocessor 130 (i.e., the output control circuitry 134 and the functional pin 131) and the other with software routines (i.e., the differentiator 137, the external event controller 138 and the normal operation controller 139) that may be stored in memory of the microprocessor 130.

In one embodiment, the differentiator 137 may be configured to determine if a reset is initiated by an external event signal received at the reset input pin 132 or a reset signal from another reset source by determining a reset status of the microprocessor 130. The reset status of the microprocessor 130 indicates if the microprocessor 130 has already powered-up and been through initialization. The reset status may be realized by the differentiator 137 by examining a memory or memory location of the microprocessor 130. For example, when the microprocessor 130 begins the reset process, the microprocessor 130 begins initialization from the beginning. In order to differentiate between a reset initiated by an external event signal when the microprocessor 130 is already operational (i.e., already been initialized) and other possible reset conditions (e.g., power-up or manual reset), the differentiator 137 can examine recorded history of previous events.

In one embodiment, a special code number or alphanumeric value (i.e., a token) can be written into one or more RAM locations of the microprocessor 130 after power-up. When the microprocessor 130 restarts after detecting any reset condition, these specific RAM location(s) can be checked for the special token values. If the special token values are present in the RAM, then the microprocessor 130 has already powered-up and has been through initialization, indicating a reset initiated by an external event. If the RAM locations are zeros or some other random value, the microprocessor 130 may be undergoing a normal power-up reset and not a reset generated by the occurrence of a monitored event.

The method of examining the history of the microprocessor 130 may vary depending on the type of microprocessor. In some embodiments, the special tokens may be written to another type of non-volatile memory (EEPROM or Flash) or by using a special reset status register that is present in some microprocessors that provide the source of the last reset event. In other embodiment, a register of the microprocessor 130 may be used to maintain its value through an external reset event from an external event signal but initializes to a specific value when a power-up reset occurs. One skilled in the art will understand the special reset status registers that are included in some conventional microprocessors.

The responding circuit 128 is coupled to the functional pin 131 and is configured to initiate a predetermined action when the functional pin 131 is set to a reset state. In some embodiments, the responding circuit 128 may also be configured to perform at least a part of the predetermined action. The responding circuit 128 includes the necessary devices and components, such as an activation component and a controlling component, to initiate the predetermined action. In one embodiment, the responding circuit 128 includes a switch that is operated when the functional pin 131 is set to a reset state. In one embodiment, the switch is a transistor. Other types of switches, such as an electromechanical switch, may also be used. In other embodiments, the responding circuit 128 may include another device or devices to initiate the predetermined action. The activation component of the responding circuit 128 may cooperate with the functional pin 131 to operate the switch or other device(s) to initiate and/or perform the predetermined action. The activation component may be a resistor that is coupled to a power source of the microprocessor 130.

Figure 2:
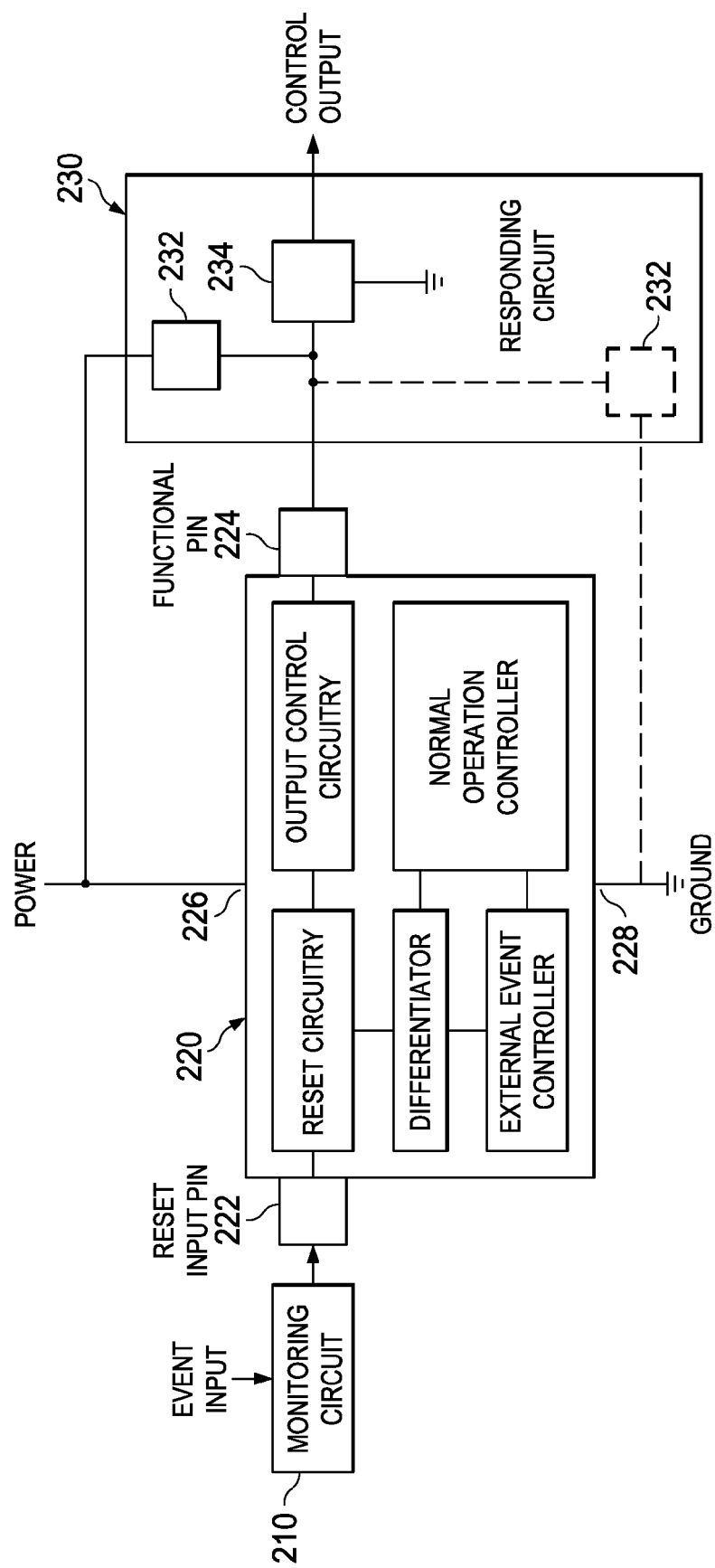
FIG. 2 is a block diagram of a high speed interrupter constructed according to the principles of the present disclosure.

FIG. 2 is a schematic diagram of an embodiment of an interrupter 200 constructed according to the principles of the present invention. The interrupter 200 includes a monitoring circuit 210, a microprocessor 220 and a responding circuit 230. The interrupter 200 also includes the appropriate conductors to connect each of the components thereof.

The monitoring circuit 210 is configured to monitor for an occurrence of an event and generate an external event signal when detecting the occurrence. The monitoring circuit 210 may include one or a plurality of monitoring devices to detect the occurrence of the event. The monitoring circuit 210 receives an event input that indicates the occurrence of the event and generates an external event signal. The external event signal is a digital signal and the event input may be a digital or an analog input. The monitoring circuit 210, therefore, includes the necessary components to monitor for the occurrence of an event and generate a digital signal, the external event signal, to indicate occurrence of the event.

The microprocessor 220 includes a plurality of input/output pins including a reset input pin 222 and a functional pin 224. Additionally, the microprocessor 220 includes a power pin 226 and a ground pin 228. The power pin 226 and the ground pin 228 are coupled to a power supply and ground, respectively, to provide power for the microprocessor 220. The functional pin 224 is coupled to the responding circuit 230. The reset input pin 222 is coupled to the monitoring circuit 210. The microprocessor 220 also includes reset circuitry, output control circuitry, a differentiator, an external event controller and a normal operation controller. Each of these components of the microprocessor 220 may be configured as and operate as the corresponding components of the microprocessor 130 of FIG. 1.

The responding circuit 230 includes an activation component 232 and a controlling component 234. The activation component 232 is coupled to a power source. In one embodiment, the activation component 232 may be a resistor. For example, the activation component 232 may be a pull-up resistor or resistors that is coupled to the power supply and causes operation of the controlling component 234 when the functional pin is set to a high impedance. In other embodiments, the activation component 232 may be located differently than illustrated in FIG. 2. For example, as denoted by the dashed lines, the activation component 232 may be coupled to the ground source for the microprocessor 130. As such, when the functional pin 224 goes to a high impedance, the activation component 232 (e.g., a resistor or resistors) acts as a pull-down resistor to operate the controlling component 234. The controlling component 234 may be a switch. For example, the controlling component may be a FET. The controlling component 234 initiates the predetermined action as a response to the occurrence of an external event.

The interrupter 200 is configured to provide hardware interrupting functionality in response to monitored events. For example, in one embodiment, the interrupter 200 can be used to provide Over Voltage Protection (OVP) shutdown of a power module. In this embodiment, the monitoring device 212 may be an opto coupler that provides a galvanic isolated connection to a secondary of the power module and provides an external event signal to the reset input pin 222. More specifically, when an overvoltage condition occurs, the opto coupler can provide a short-to-ground that drives the reset input pin 222 of the microprocessor 220 to low. The drive output on the functional pin 224 (i.e., the drive output on the controlling component which may be a FET) goes to high impedance. The activation component 232 (e.g., a pull-up resistor) turns-on the FET which can disable a Pulse Width Modulator (PWM) of the power module. The disabling process of the power module occurs without employing software. Instead, the hardware reset functionality of the microprocessor 220 and the responding circuit 230 provides an interrupt capability for the power module.

Accordingly, when an external priority event drives the reset input pin 222, the hardware of the microprocessor 220 almost immediately (or substantially immediately) causes all the other port pins of the microprocessor, including the functional pin 224 to become inputs. As such, each of the port pins goes to a reset state. The activation component 232 is connected to the critical control output (the functional pin 224) of the microprocessor 220 and tied to the correct control voltage to default to the proper control level voltage required to operate the controlling component 234 when the functional pin 224 is set to the reset state.

Thus, the interrupter 200 may be used for OVP. After a reset event (i.e., an overvoltage event in this embodiment), the differentiator of the microprocessor 220 may check for a reset value of the microprocessor 220 during the initialization routine of the microprocessor 220. The differentiator may check for special token values in specific memory locations of the microprocessor 220 to determine the reset status thereof. The reset status will indicate if the microprocessor 220 has already been powered-up. Accordingly, the differentiator can determine the memory values are "persistent" and are not initialized upon reset.

Figure 3:
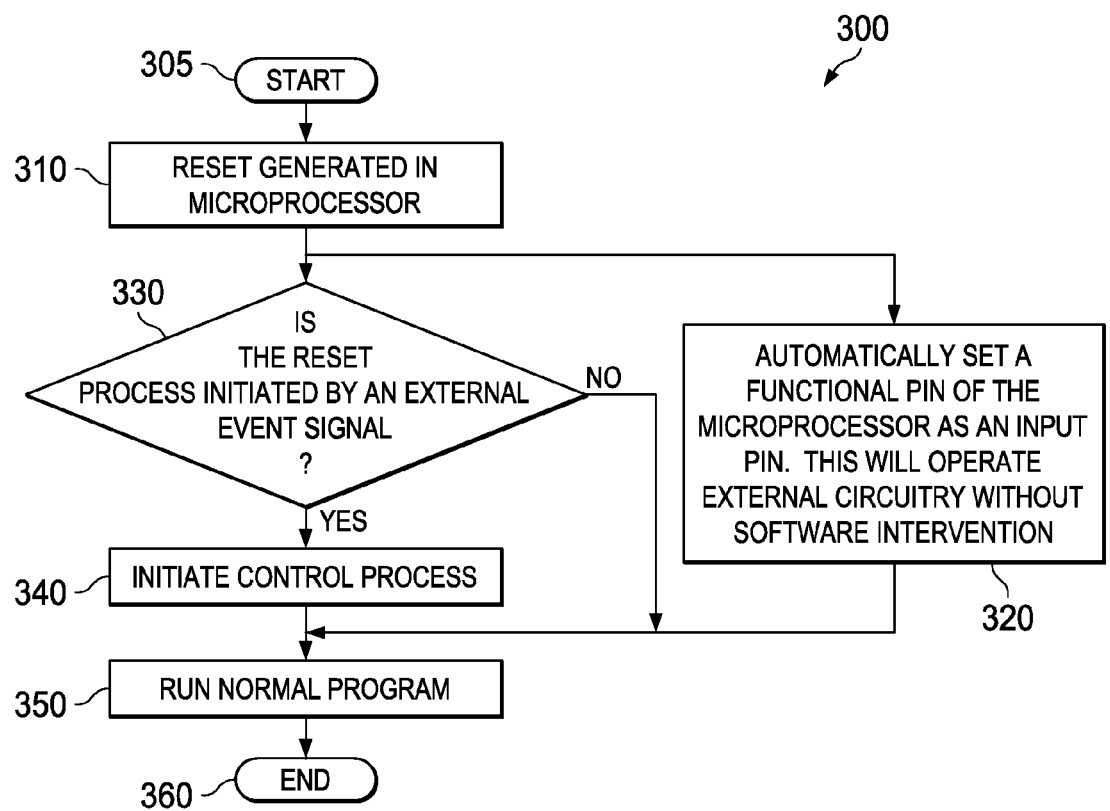
FIG. 3 is a flow diagram of a method of responding to a monitored event carried out according to the principles of the present disclosure.

FIG. 3 is a flow diagram of an embodiment of a method 300 of responding to a monitored event carried out according to the principles of the present invention. The method may be carried out employing an interrupter such as disclosed in FIG. 1 or FIG. 2. As illustrated, the method 300 includes parallel hardware and software responses. The method begins in a step 305.

In a step 310, a reset process is generated in a microprocessor. A functional pin of the microprocessor is then automatically set as an input pin in a step 320 in response to initiation of the reset process. Typically, all of the functional pins are set as input pins. As such, the functional pins of the microprocessor are set to a reset state in response to the reset process. Due to the functional pin(s) being set to a reset state, circuitry external to the microprocessor is automatically operated. For example, a responding circuit such as disclosed in FIG. 1 may be automatically operated.

Also in response to initiation of the reset process, a determination is made in a decisional step 330 if the reset process was initiated by an external event signal. In one embodiment, determining may include determining a reset status of the microprocessor. If the reset process was initiated by external event signal, then a control process for the occurrence of the event is initiated in a step 340. The control process may be an action or set of actions associated with the external event. For example, the control process may include, but is not limited to, continuation of the actions directed by the functional pin, system shutdown or possibly the recording of data related to the external event. After initiating the control process, the method 300 then continues to step 350 to run normal programming. The method 300 then ends in a step 360.

Returning now to the decisional step 330, if the reset process was not initiated by an external event signal, then the method 300 continues to step 350 and runs the normal programming. Normal programming includes those processes related to the normal functioning of a device (i.e., a microprocessor) and typically run regardless of whether an external event has occurred or not. This can include, but is not limited to, initialization of the device hardware, control sequences required for standard operation of the device or possibly processing for status display. Thereafter, the method 300 ends at the step 360.

Those skilled in the art to which this application relates will appreciate that other and further additions, deletions, substitutions and modifications may be made to the described embodiments.

What is claimed is:

1. An interrupter, comprising:
    a monitoring circuit configured to monitor for an occurrence of at least one event and generate an external event signal when detecting said occurrence;
    a microprocessor, including:
        at least one functional pin; and
        a reset input pin, coupled to said monitoring circuit, said microprocessor configured to begin a reset process in response to receiving said external event signal at said reset input pin and thereby set said functional pin to a reset state; and
    a responding circuit coupled to said functional pin and configured to initiate a predetermined action when said functional pin is set to a reset state.

2. The interrupter as recited in claim 1 wherein said microprocessor further comprises a differentiator configured to determine if said reset process was initiated by said external event signal or another reset source.

3. The interrupter as recited in claim 2 wherein said differentiator is further configured to initiate a control process for said occurrence if said reset process was initiated by said external event signal.

4. The interrupter as recited in claim 3 wherein said control process includes maintaining said predetermined action.

5. The interrupter as recited in claim 2 wherein said differentiator is configured to determine if said reset process was initiated by said external event signal or said another reset source by determining a reset status of said microprocessor.

6. The interrupter as recited in claim 1 wherein said microprocessor does not include an interrupt functionality.

7. The interrupter as recited in claim 1 wherein said responding circuit includes a switch that is operated to initiate said predetermined action.

8. A method of responding to a monitored event, comprising:
    initiating a reset process of a microprocessor;
    automatically setting at least one functional pin of said microprocessor to a reset state in response to said reset process;
    operating circuitry that is external to said microprocessor based on said automatically setting to initiate an action; and
    determining if said reset process was initiated by an external event signal or another reset source associated with said microprocessor.

9. The method as recited in claim 8 wherein said external event signal indicates an occurrence of an event.

10. The method as recited in claim 9 further comprising initiating a control process for said occurrence if said reset process was initiated by said external event signal.

11. The method as recited in claim 10 wherein said control process is to maintain said action.

12. The method as recited in claim 8 wherein said microprocessor does not include an interrupt functionality.

13. The method as recited in claim 8 wherein said operating circuitry includes a switch.

14. The method as recited in claim 9 wherein said determining includes determining a reset status of said microprocessor.

15. An integrated circuit, comprising:
    a functional block; and
    an interrupter, comprising:
        a monitoring circuit configured to monitor for an occurrence of an event associated with said functional block and generate an external event signal when detecting said occurrence;

a microprocessor, including:
  a functional pin; and
  a reset input pin, coupled to said monitoring circuit, said microprocessor configured to begin a reset process in response to receiving said external event signal at said reset input pin and thereby set said functional pin to a reset state; and
a responding circuit coupled to said functional pin and configured to initiate a predetermined action when said functional pin is set to said reset state.

16. The integrated circuit as recited in claim 15 wherein said microprocessor further comprises a differentiator configured to determine if said reset process was initiated by said external event signal or another reset source associated with said microprocessor.

17. The integrated circuit as recited in claim 16 wherein said differentiator is further configured to initiate a control process for said occurrence if said reset process was initiated by said external event signal.

18. The integrated circuit as recited in claim 17 wherein said control process includes maintaining said predetermined action.

19. The integrated circuit as recited in claim 15 wherein said microprocessor does not include an interrupt functionality.

20. The integrated circuit as recited in claim 15 wherein said microprocessor includes an external event controller configured to perform a control process when said reset process is initiated by said external event signal.

* * * * *